United States Patent

Muszumanski

[11] 3,870,401
[45] Mar. 11, 1975

[54] INVERTED TELEPHOTO-TYPE LENS
[75] Inventor: Trude Muszumanski, Vienna, Austria
[73] Assignees: Karl Vockenhuber; Raimund Hauser, both of Vienna, Austria
[22] Filed: Mar. 19, 1973
[21] Appl. No.: 342,884

Related U.S. Application Data
[63] Continuation-in-part of Ser. No. 130,582, April 2, 1971, abandoned.

[30] Foreign Application Priority Data
Apr. 8, 1970  Austria .............................. 3237/70

[52] U.S. Cl. ................................. 350/214, 350/230
[51] Int. Cl. ............................ G02b 9/64, G02b 9/04
[58] Field of Search ............ 350/214, 215, 230, 232

[56] References Cited
UNITED STATES PATENTS
3,277,784  10/1966  Hudson .......................... 350/214 X Primary Examiner—Paul A. Sacher
Attorney, Agent, or Firm—Ernest G. Montague; Karl F. Ross; Herbert Dubno

[57] ABSTRACT

The lens has far and near conjugate foci and comprises a negative forward lens element group disposed at that end of the lens of the present disclosure which faces said far conjugate focus and a positive rear lens element group disposed at that end of the lens which faces said near conjugate focus and separated from said forward lens element group by a substantial air gap. The forward lens element group consists of a first lens component and a biconcave second lens component, said biconcave lens component having a rear surface adjoining said air gap and a forward surface remote from said air gap. Said forward and rear surfaces have radii of curvature $r_3$ and $r_4$, respectively, which meet the condition:

$|2 r_4| < |r_3| < |4 r_4|$.

8 Claims, 1 Drawing Figure

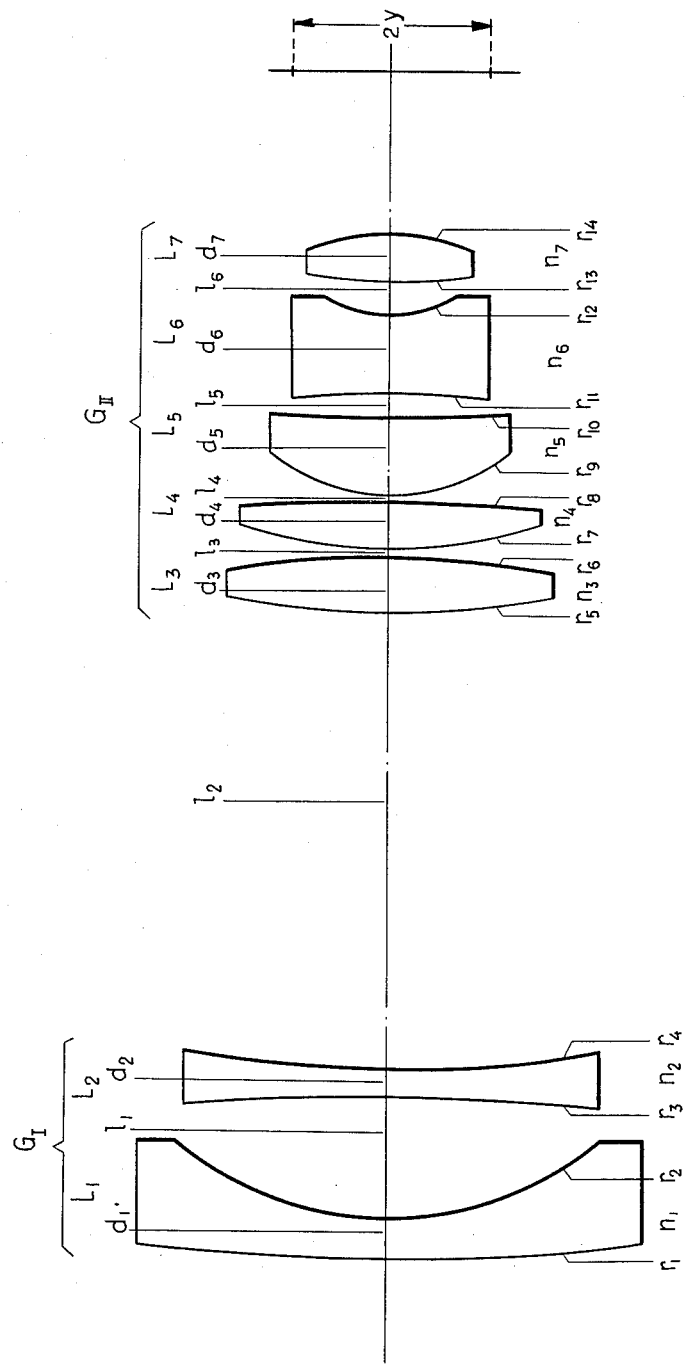

INVERTED TELEPHOTO-TYPE LENS

The present invention is a continuation-in-part of my copending patent application Ser. No. 130,582, filed on Apr. 2, 1971, now abandoned.

This invention relates to a high-speed lens, preferably a projection lens, particularly for Super-8 film, which lens is an inverted telephoto-type lens comprising a negative forward lens element group consisting of at least two lens elements and a positive rear lens element group, where "forward" and "rear" indicate the directions toward the far and near conjugate foci, and said lens element groups are separated by a substantial air gap. The useful image angle should suitably amount at least to ±28°.

Numerous lenses of that type are known and have been described e.g., in the U.S. Pat. Nos. 2,696,758 and 2,612,077, the French Pat. No. 1,396,907, the Opened German application 1,472,135, the German Pat. No. 1,207,769 and the Printed German application No. 1,104,210. Such lenses have also been discussed in detail in an article by Rudolf Kingslake in the Journal of SMPTE, March 1966. As far as a comparable performance as regards the speed and image angle are concerned, many of these lenses have been designed for relatively large film frames. A scaled reduction in size for adaptation to a substandard film, particularly to Super-8 film, would involve such highly curved radii and such small lens thicknesses that economical manufacture would appear to be difficult. The known lenses define above had five to six radii which were smaller than the diagonal $2y$ of the image field to be projected. On the other hand, those of the known lenses of the type described which have such dimensions that they may be used for Super-8 film do not meet present-day requirements as to speed and/or useful image angle. Where lenses are known which meet present-day requirements both as to dimensions and as to speed and image angle, in these lenses, except highly expensive ones, the correction not only of image errors of higher order, mainly of the zonal variation of the spherical aberration, but also of the primary image errors, such as distortion and astigmatism, is unsatisfactory.

It is an object of the present invention to provide a high-speed lens which meets particularly high requirements as to overall correction and which exhibits only a slight decrease in brightness toward the edge of the image. Besides, the refractive powers of each lens element should be as small as possible so that there are not more than two radii which are shorter than the image diagonal $2y$ of the film picture to be projected. Nevertheless, the overall length measured from the first lens vertex to the last, should be small and preferably should not exceed 5.5 times the focal length of the lens. This object is accomplished by the invention by the provision of an inverted telephoto-type lens in which the biconcave second lens element $L_2$ of the forward lens element group has a radius $r_3$ at the end facing the first lens element of the same group and a rear radius $r_4$ at the end facing the rear lens element group and said radii meet the condition $$|2r_4| < |r_3| < |4 r_4|$$

In this way, the aberrations of the oblique pencils or rays of light are so favorably influenced and the vignetting, which is desired for correction in inverted telephoto-type lenses, is reduced to only such a small extent that the entrance pupil for the outermost edge of the image is still about 70 percent of the entrance pupil for the center of the image. In this way, a good correction is obtained for a useful image angle of at least ±28° and there is no need for more than seven lens elements so that the lens can be manufactured economically. Special glasses are not required.

To eliminate chromatic astigmatism and color coma, the dispersion of the glasses of lens elements L and L is suitably so small that the corresponding Abbe numbers meet the following inequalities:

$$vd_1 \geq 65$$
$$vd_2 \geq 65$$

The design of the positive second lens element group is important in connection with some higher order image errors, such as the zonal variation of spherical aberration at the center of the image and on the oblique pencils. For this reason, it is a feature of the invention that the rear lens element group comprises lens elements having such a small refractive powers that there are not more than two radii which are shorter than the image diagonal $2y$. This may preferably be accomplished in that the rear focal distance of that lens element of the rear lens element group which faces the forward lens element group is smaller than 10 times the total focal length of the lens so that rays which are incident parallel to the axis will distinctly converge behind that lens $L_3$.

The present invention relates to a light strong objective preferably a projection objective, in particular for the Super-8-format, of the type of the reversed teleobjectives in accordance with the above-mentioned features.

Particularly the invention relates to light strong objectives, in which the individual breaking forces are held particularly weak, thereby suitably at most two radii are shorter than the image of field diagonal $2y$ of the film image to be projected. The structural length of this objective, measured from the first to the last lens, amounts to no more than 5.5 times of the objective focal width. The second biconcave element $L_2$ of the front lens group with its radius $r_3$ pointing towards its front element $L_1$ and its radius $r_4$ pointing to the rear lens group is subject to the following condition:

$$|2r_4| < |r_3| < |4 r_4|$$

In this manner also the operation of the inclined bundle is influenced so favorably and the vignetting required in the reversed telephoto type for corrective reasons is limited to such a small degree, that the entrance pupil for the outer image edge still amounts to about 70 percent of the entrance pupil in the image center.

The present invention further relates to a further development and has an object an increase of the relative opening. Since, however, thereby the zonal deviation of the spherical aberration increases very fast, in order to avoid this drawback, it is proposed in accordance with the present invention that the center thickness of the first, third and fourth, elements $L_3$, $L_5$ and $L_6$ of the rear lens group satisfy the following conditions:

$$d_3 > 0.5f$$
$$d_5 > 0.5f$$
$$d_6 > 0.5f$$

wherein $f$ stands for the focal length of the entire lens system.

Further details and advantages of the invention will become apparent from the following description of embodiments with reference to the drawing, which is a sectional view showing a lens according to the invention.

The lens shown in the drawing consists of a negative lens element group $G_I$ and a positive lens element group $G_{II}$. The two lens element groups $G_I$, $G_{II}$ are separated by a relatively large air gap $l_2$. The lens element group $G_I$ consists of a negative meniscus $L_1$, which is convexly curved on the side facing the far conjugate focus, and a second negative individual lens element $L_2$, which in accordance with the invention consists of a biconcave lens element. The lens element group $G_{II}$ is composed of four positive individual lens elements $L_3$, $L_4$, $L_5$, and $L_7$ and one negative individual lens element $L_6$. The negative lens element $L_6$ is disposed between three successive positive lens elements $L_3$, $L_4$, $L_5$ on the side facing the forward lens element group $G_I$ and the fourth positive lens element $L_7$ facing the film picture to be projected.

Hereinafter, numerical data will be stated for two desirable embodiments of the invention. In these data, $d_1$ to $d_7$ are the axial thicknesses of the individual lens elements $L_1$ to $L_7$. $r_1$ to $r_{14}$ are the radii of curvature of the surfaces of the lens elements in the succession from the forward surface of lens element $L_1$ to the rear surface of lens element $L_7$. $l_1$ to $l_6$ are the lengths of the air gaps between the vertices of successive lens elements in the succession from lens element $L_1$ to lens elements $L_7$. $n_{d_1}$ to $n_{d_7}$ are the refractive indices of lens elements $L_1$ to $L_7$, respectively. $v_{d_1}$ to $v_{d_7}$ are the Abbe numbers of lens elements $L_1$ to $L_7$, respectively. $s'$ is the backfocus. $f$ is the overall focal distance and $2y$ the image field diagonal.

Example I

| | | | | |
|---|---|---|---|---|
| $L_1$ | $r_1 +10.650$ | $d_1 = 0.215$ | $n_{d_1} = 1.487$ | $v_{d_1} = 70.4$ |
| | $r_2 + 1.689$ | | | |
| | | $l_1 = 0.615$ | | |
| $L_2$ | $r_3 - 20.931$ | $d_2 = 0.169$ | $n_{d_2} = 1.518$ | $v_{d_2} = 65.1$ |
| | $r_4 + 6.461$ | | | |
| | | $l_2 = 2.415$ | | |
| $L_3$ | $r_5 + 4.541$ | $d_3 = 0.323$ | $n_{d_3} = 1.518$ | $v_{d_3} = 65.1$ |
| | $r_6 - 4.541$ | | | |
| | | $l_3 = 0.015$ | | |
| $L_4$ | $r_7 + 2.548$ | $d_4 = 0.262$ | $n_{d_4} = 1.620$ | $v_{d_4} = 60.3$ |
| | $r_8 - 24.784$ | | | |
| | | $l_4 = 0.015$ | | |
| $L_5$ | $r_9 + 0.988$ | $d_5 = 0.446$ | $n_{d_5} = 1.504$ | $v_{d_5} = 66.9$ |
| | $r_{10} + 13.517$ | | | |
| | | $l_5 = 0.108$ | | |
| $L_6$ | $r_{11} - 4.626$ | $d_6 = 0.431$ | $n_{d_6} = 1.785$ | $v_{d_6} = 26.1$ |
| | $r_{12} + 0.668$ | | | |
| | | $l_6 = 0.154$ | | |
| $L_7$ | $r_{13} + 2.587$ | $d_7 = 0.277$ | $n_{d_7} = 1.658$ | $v_{d_7} = 57.3$ |
| | $r_{14} - 1.093$ | | | |
| $s'$ | 0.840 | | | |
| $f$ | 1.000 | | | |

Relative aperture 1:1.6
Useful image angle ±28°
$2y = 1.064$

Example II

| | | | | |
|---|---|---|---|---|
| $L_1$ | $r_1 + 10.853$ | $d_1 = 0.221$ | $n_{d_1} = 1.487$ | $v_{d_1} = 70.4$ |
| | $r_2 + 1.848$ | | | |
| | | $l_1 = 0.614$ | | |
| $L_2$ | $r_3 - 14.482$ | $d_2 = 0.166$ | $n_{d_2} = 1.518$ | $v_{d_2} = 65.1$ |
| | $r_4 + 6.463$ | | | |
| | | $l_2 = 2.414$ | | |
| $L_3$ | $r_5 + 4.541$ | $d_3 = 0.317$ | $n_{d_3} = 1.518$ | $v_{d_3} = 65.1$ |
| | $r_6 - 4.541$ | | | |
| | | $l_3 = 0.014$ | | |
| $L_4$ | $r_7 + 2.547$ | $d_4 = 0.262$ | $n_{d_4} = 1.620$ | $v_{d_4} = 60.3$ |
| | $r_8 - 31.964$ | | | |
| | | $l_4 = 0.014$ | | |
| $L_5$ | $r_9 + 0.908$ | $d_5 = 0.441$ | $n_{d_5} = 1.504$ | $v_{d_5} = 66.9$ |
| | $r_{10} + 11.682$ | | | |
| | | $l_5 = 0.110$ | | |
| $L_6$ | $r_{11} - 5.071$ | $d_6 = 0.428$ | $n_{d_6} = 1.785$ | $v_{d_6} = 26.1$ |
| | $r_{12} + 0.611$ | | | |
| | | $l_6 = 0.152$ | | |
| $L_7$ | $r_{13} + 2.448$ | $d_7 = 0.276$ | $n_{d_7} = 1.678$ | $v_{d_7} = 55.2$ |
| | $r_{14} - 1.115$ | | | |
| $s'$ | 0.753 | | | |
| $f$ | 1.000 | | | |

Relative aperture 1:1.6
Useful image angle ±28°
$2y = 1.064$

The above data are subject to the following tolerances: The curvature of any surface may deviate so that the refractive power of the respective lens element is changed by as much as ±10 percent. The thickness of any lens element may deviate by as much as ±10 percent any refractive index by as much as ±0.03 and any Abbe number by as much as ±5.

jective, measured from the first to the last lens, amounts no more than 5.5 times of the objective focal width. The second biconcave element $L_2$ of the front lens group with its radius $r_3$ pointing towards its front element $L_1$ and its radius $r_4$ pointing to the rear lens group is subject to the following condition:

$$|2r_4|<|r_3|<|4r_4|.$$

Example III

| | | | | |
|---|---|---|---|---|
| $L_1$ | $r_1 + 10.650$ | $d_1 = 0.215$ | $n_{d_1} = 1.487$ | $v_{d_1} = 70.4$ |
| | $r_2 + 1.689$ | $l_1 = 0.615$ | | |
| $L_2$ | $r_3 - 17.000$ | $d_2 = 0.169$ | $n_{d_2} = 1.518$ | $v_{d_2} = 65.1$ |
| | $r_4 + 6.958$ | $l_2 = 2.415$ | | |
| $L_3$ | $r_5 + 4.541$ | $d_3 = 0.323$ | $n_{d_3} = 1.518$ | $v_{d_3} = 65.1$ |
| | $r_6 - 4.541$ | $l_3 = 0.015$ | | |
| $L_4$ | $r_7 + 2.548$ | $d_4 = 0.262$ | $n_{d_4} = 1.620$ | $v_{d_4} = 60.3$ |
| | $r_8 - 24.784$ | $l_4 = 0.015$ | | |
| $L_5$ | $r_9 + 0.988$ | $d_5 = 0.446$ | $n_{d_5} = 1.504$ | $v_{d_5} = 66.9$ |
| | $r_{10} + 13.517$ | $l_5 = 0.108$ | | |
| $L_6$ | $r_{11} - 4.626$ | $d_6 = 0.431$ | $n_{d_6} = 1.789$ | $v_{d_6} = 26.1$ |
| | $r_{12} + 0.668$ | $l_6 = 0.154$ | | |
| $L_7$ | $r_{13} + 2.587$ | $d_7 = 0.277$ | $n_{d_7} = 1.658$ | $v_{d_7} = 57.3$ |
| | $r_{14} - 1.093$ | | | |

$s'$ 0.840
$f$ 1.000
Relative aperture 1:1.6
Useful image angle ±28°
$2y = 1.064$ Example IV

| | | | | |
|---|---|---|---|---|
| $L_1$ | $r_1 + 10.650$ | $d_1 = 0.215$ | $n_{d_1} = 1.487$ | $v_{d_1} = 70.4$ |
| | $r_2 + 1.689$ | $l_1 = 0.615$ | | |
| $L_2$ | $r_3 - 24.000$ | $d_2 = 0.169$ | $n_{d_2} = 1.518$ | $v_{d_2} = 65.1$ |
| | $r_4 + 6.215$ | $l_2 = 2.415$ | | |
| $L_3$ | $r_5 + 4.541$ | $d_3 = 0.323$ | $n_{d_3} = 1.518$ | $v_{d_3} = 65.1$ |
| | $r_6 - 4.541$ | $l_3 = 0.015$ | | |
| $L_4$ | $r_7 + 2.548$ | $d_4 = 0.262$ | $n_{d_4} = 1.620$ | $v_{d_4} = 60.3$ |
| | $r_8 - 24.784$ | $l_4 = 0.015$ | | |
| $L_5$ | $r_9 + 0.988$ | $d_5 = 0.446$ | $n_{d_5} = 1.504$ | $v_{d_5} = 66.9$ |
| | $r_{10} + 13.517$ | $l_5 = 0.108$ | | |
| $L_6$ | $r_{11} - 4.626$ | $d_6 = 0.431$ | $n_{d_6} = 1.785$ | $v_{d_6} = 26.1$ |
| | $r_{12} + 0.668$ | $l_6 = 0.154$ | | |
| $L_7$ | $r_{13} + 2.587$ | $d_7 = 0.277$ | $n_{d_7} = 1.658$ | $v_{d_7} = 57.3$ |
| | $r_{14} - 1.093$ | | | |

$s'$ 0.840
$f$ 1.000
Relative aperture 1:1.6
Useful image angle ±28°
$2y = 1.064$ The present invention relates to a light strong objective preferably a projection objective, in particular for the Super-8-format, of the type of the reversed teleobjectives in accordance with the above-mentioned features.

Particular the invention relates to light strong objective, in which the individual breaking forces are held particularly weak, thereby suitably at most two radii are shorter than the image field diagonal 2y of the film image to be projected. The structural length of this ob- In this manner also the operation of the inclined bundle are influenced so favorably and the vignetting required in the reversed telephoto type for corrective reasons is limited to such a low measure, that the entrance pupil for the outer image edge still amounts to about 70 percent of the entrance pupil in the image center.

The present invention further increases the relative opening. Since, however, thereby the zonal deviation of the spherical aberration increases very fast, in order to avoid this drawback, in accordance with the present invention the center thickness of the first, third and fourth, elements $L_3$, $L_5$ and $L_6$ of the rear lens group satisfy the following conditions:

$$d_3 > 0.5f$$
$$d_5 > 0.5f$$
$$d_6 > 0.5f$$

wherein $f$ stands for the focal length of the entire lens system.

The relative opening could thereby be increased from 1:1.6 to 1:1.3 with a usable image angle ± 20° up to ± 250. Yet also a manufacturing technical advantage of the present objective compared with that disclosed above could have been obtaned by the fact, that now a radius is shorter than the image field diagonal relative to two of the rear lens group.

The structure of the objective in accordance with the present invention equals that disclosed above and to the objective, shown in the drawing, and comprises a lens group $G_I$ with negative focal length and a lens group $G_{II}$ with positive focal length. The two lens groups $G_I$, $G_{II}$ are separated from each other by a relatively large air distance $l_2$. The lens group $G_I$ comprises a negative meniscus $L_1$ convexly curved towards the side of the longer conjugated section width and a second negative individual lens $L_2$ which is formed in accordance with the invention as a biconcave lens. The lens group $G_{II}$ is however made of four positive breaking and one negative breaking individual lens $L_3$, $L_4$, $L_5$ and $L_7$ or $L_6$, composed such that between the positive lenses $L_3$, $L_4$, $L_5$ arranged behind one another and pointing to the forward lens group $G_I$ and the fourth positive lens $L_7$ pointing toward the film image to be projected, stands the negative lens $L_6$.

Below are disclosed the numerical data for two examples, in which the present invention is realized in a particularly advantageous form. In this connection $r_1$ to $r_{14}$ in the curvature radii. $d_1$ to $d_7$, the axial thicknesses of the individual lenses. $l_1$ to $l_6$ the air distances between the lens heads, and $d_1$ to $n_{d_7}$ and $v_{d_1}$ to $v_{d_7}$ the breaking numbers or the Abbe numbers, respectively, of the seven individual lenses. $s'$ means the section width, $f$ the total focal length and $2y$ the image field diagonals.

Example V:

| Lens | $r$ | $d$ / $l$ | $n_d$ | $v_d$ |
|---|---|---|---|---|
| $L_1$ | $r_1 + 10.560$ | $d_1 = 0.210$ | $n_{d_1} = 1.487$ | $v_{d_1} = 70.4$ |
|  | $r_2 + 1.608$ | $l_1 = 0.611$ | | |
| $L_2$ | $r_3 - 21.033$ | $d_2 = 0.171$ | $n_{d_2} = 1.518$ | $v_{d_2} = 65.1$ |
|  | $r_4 + 6.439$ | $l_2 = 2.405$ | | |
| $L_3$ | $r_5 + 3.878$ | $d_3 = 0.552$ | $n_{d_3} = 1.518$ | $v_{d_3} = 65.1$ |
|  | $r_6 - 5.465$ | $l_3 = 0.013$ | | |
| $L_4$ | $r_7 + 2.536$ | $d_4 = 0.315$ | $n_{d_4} = 1.620$ | $v_{d_4} = 60.3$ |
|  | $r_8 - 25.565$ | $l_4 = 0.011$ | | |
| $L_5$ | $r_9 + 1.084$ | $d_5 = 0.512$ | $n_{d_5} = 1.504$ | $v_{d_5} = 66.9$ |
|  | $r_{10}$ plan | $l_5 = 0.097$ | | |
| $L_6$ | $r_{11} - 4.616$ | $d_6 = 0.526$ | $n_{d_6} = 1.785$ | $v_{d_6} = 26.1$ |
|  | $r_{12} + 0.673$ | $l_6 = 0.155$ | | |
| $L_7$ | $r_{13} + 2.037$ | $d_7 = 0.289$ | $n_{d_7} = 1.691$ | $v_{d_7} = 54.7$ |
|  | $r_{14} - 1.345$ | | | |

$s' = 0.731$
$f = 1.000$
relative opening 1:1.3
± 25°
$2y = 0.933$

Example VI

| Lens | $r$ | $d$ / $l$ | $n_d$ | $v_d$ |
|---|---|---|---|---|
| $L_1$ | $r_1 + 10.654$ | $d_1 = 0.210$ | $n_{d_1} = 1.487$ | $v_{d_1} = 70.4$ |
|  | $r_2 + 1.613$ | $l_1 = 0.611$ | | |
| $L_2$ | $r_3 - 20.929$ | $d_2 = 0.170$ | $n_{d_2} = 1.518$ | $v_{d_2} = 65.1$ |
|  | $r_4 + 6.473$ | $l_2 = 2.403$ | | |
| $L_3$ | $r_5 + 3.881$ | $d_3 = 0.551$ | $n_{d_3} = 1.518$ | $v_{d_3} = 65.1$ |
|  | $r_6 - 5.498$ | $l_3 = 0.010$ | | |
| $L_4$ | $r_7 + 2.531$ | $d_4 = 0.300$ | $n_{d_4} = 1.620$ | $v_{d_4} = 60.3$ |
|  | $r_8 - 26.385$ | $l_4 = 0.010$ | | |
| $L_5$ | $r_9 + 1.087$ | $d_5 = 0.601$ | $n_{d_5} = 1.500$ | $v_{d_5} = 61.4$ |
|  | $r_{10}$ plan | $l_5 = 0.082$ | | |
| $L_6$ | $r_{11} - 1.980$ | $d_6 = 0.526$ | $n_{d_6} = 1.847$ | $v_{d_6} = 23.8$ |
|  | $r_{12} + 0.638$ | $l_6 = 0.155$ | | |
| $L_7$ | $r_{13} + 1.358$ | $d_7 = 0.290$ | $n_{d_7} = 1.643$ | $v_{d_7} = 48.0$ |
|  | $r_{14} - 1.258$ | | | |

$s' = 0.692$
$f = 1.000$
relative opening 1:1.3
± 20°
$2y = 0.728$

While I have disclosed several embodiments of the present invention, these embodiments are given by example only and not in a limiting sense.

What is claimed is:

1. An inverted telephoto-type lens having far and near conjugate foci and comprising
    a negative forward lens element group disposed at that end of the lens which faces said far conjugate focus, and
    a positive rear lens element group disposed at that end of the lens which faces said near conjugate focus and separated from said forward lens element group by a substantial air gap,
    said forward lens element group consisting of a first negative lens component and a biconcave second lens component, said biconcave lens component has a rear surface adjoining said air gap and a forward surface remote from said air gap,
    said forward and rear surfaces having radii of curvature $r_3$ and $r_4$, respectively, which meet the condition:
    $$|2r_4| < |r_3| < |4r_4|,$$
    said forward lens element group consists of two lens elements and
    said rear lens element group consists of five lens elements,
    and which has the following data

| | | | | | | | |
|---|---|---|---|---|---|---|---|
| $L_1$ | $r_1 +$ 10.650 | | $d_1 = 0.215$ | | $n_{d_1} = 1.487$ | | $v_{d_1} = 70.4$ |
| | $r_2 +$ 1.689 | | | | | | |
| | | $l_1 = 0.615$ | | | | | |
| $L_2$ | $r_3 -$ 20.931 | | $d_2 = 0.169$ | | $n_{d_2} = 1.518$ | | $v_{d_2} = 65.1$ |
| | $r_4 +$ 6.461 | | | | | | |
| | | $l_2 = 2.415$ | | | | | |
| $L_3$ | $r_5 +$ 4.541 | | $d_3 = 0.323$ | | $n_{d_3} = 1.518$ | | $v_{d_3} = 65.1$ |
| | $r_6 -$ 4.541 | | | | | | |
| | | $l_3 = 0.015$ | | | | | |
| $L_4$ | $r_7 +$ 2.548 | | $d_4 = 0.262$ | | $n_{d_4} = 1.620$ | | $v_{d_4} = 60.3$ |
| | $r_8 -$ 24.784 | | | | | | |
| | | $l_4 = 0.015$ | | | | | |
| $L_5$ | $r_9 +$ 0.988 | | $d_5 = 0.446$ | | $n_{d_5} = 1.504$ | | $v_{d_5} = 66.9$ |
| | $r_{10} +$ 13.517 | | | | | | |
| | | $l_5 = 0.108$ | | | | | |
| $L_6$ | $r_{11} -$ 4.626 | | $d_6 = 0.431$ | | $n_{d_6} = 1.785$ | | $v_{d_6} = 26.1$ |
| | $r_{12} +$ 0.668 | | | | | | |
| | | $l_6 = 0.154$ | | | | | |
| $L_7$ | $r_{13} +$ 2.587 | | $d_7 = 0.277$ | | $n_{d_7} = 1.658$ | | $v_{d_7} = 57.3$ |
| | $r_{14} -$ 1.093 | | | | | | |

$s'$ 0.840
$f$ 1.000
Relative aperture 1:1.6
Useful image angle 28
$2y$ 1.064 where $d_1$ and $d_7$ are the axial thicknesses of said lens elements in the succession from that end of the lens which faces said far conjugate focus to that end of the lens which faces said near conjugate focus, $r_1$ to $r_{14}$ are the radii of curvature of the surfaces of said lens elements in the succession from that surface which faces said far conjugate focus to that surface which faces said near conjugate focus, $l_1$ to $l_6$ are the lengths of the air gaps between the vertices of lens elements in the succession from that end of the lens which faces said far conjugate focus to that end of the lens which faces said near conjugate focus, $n_{d_1}$ to $n_{d_7}$ are the refractive powers and $v_d$ to $v_d$ are the Abbe numbers of said lens elements in the succession from that end of the lens which faces said far conjugate focus to that end of the lens which faces said near conjugate focus.

2. A lens as set forth in claim 1, in which
    said lens has an image field diagonal,
    said rear lens element group comprises lens elements having curved surfaces, and
    at most two of said curved surfaces have radii of curvature smaller than the image field diagonal.

3. An inverted telephoto-type lens having far and near conjugate foci and comprising
    a negative forward lens element group disposed at that end of the lens which faces said far conjugate focus, and
    a positive rear lens element group disposed at that end of the lens which faces said near conjugate focus and separated from said forward lens element group by a substantial air gap,
    negative lens component and a biconcave second lens component, said biconcave lens component has a rear surface adjoining said air gap and a forward surface remote from said air gap,
    said forward and rear surfaces having radii of curvature $r_3$ and $r_4$, respectively, which meet the condition:
    $$|2r_4| < |r_3| < |4r_4|.$$

4. An inverted telephoto-type lens having far and near conjugate foci and comprising
    a negative forward lens element group disposed at that end of the lens which faces said far conjugate focus, and a positive rear lens element group disposed at that end of the lens which faces said near conjugate focus and separated from said forward lens element group by a substantial air gap, said forward lens element group consisting of a first negative lens component and a biconcave second lens component, said biconcave lens component has a rear surface adjoining said air gap and a forward surface remote from said air gap, said forward and rear surfaces having radii of curvature $r_3$ and $r_4$, respectively, which meet the condition:

$$|2r_4| < |r_3| < |4 r_4|,$$

said forward lens element group consists of two lens elements and said rear lens elements group consists of five lens elements, and which has the following data

| | | | | |
|---|---|---|---|---|
| L$_1$ | $r_1 +$ 10.853 | $d_1 = 0.221$ | $n_{d_1} = 1.487$ | $v_{d_1} = 70.4$ |
| | $r_2 +$ 1.848 | $l_1 = 0.614$ | | |
| | $r_3 -$ 14.482 | | | |
| L$_2$ | $r_4 +$ 6.463 | $d_2 = 0.166$ | $n_{d_2} = 1.518$ | $v_{d_2} = 65.1$ |
| | | $l_2 = 2.414$ | | |
| | $r_5 +$ 4.541 | | | |
| L$_3$ | $r_6 -$ 4.541 | $d_3 = 0.317$ | $n_{d_3} = 1.518$ | $v_{d_3} = 65.1$ |
| | | $l_3 = 0.014$ | | |
| | $r_7 +$ 2.547 | | | |
| L$_4$ | $r_8 -$ 31.964 | $d_4 = 0.262$ | $n_{d_4} = 1.620$ | $v_{d_4} = 60.3$ |
| | | $l_4 = 0.014$ | | |
| | $r_9 +$ 0.908 | | | |
| L$_5$ | $r_{10}+$ 11.682 | $d_5 = 0.441$ | $n_{d_5} = 1.504$ | $v_{d_5} = 66.9$ |
| | | $l_5 = 0.110$ | | |
| | $r_{11}-$ 5.071 | | | |
| L$_6$ | $r_{12}+$ 0.611 | $d_6 = 0.428$ | $n_{d_6} = 1.785$ | $v_{d_6} = 26.1$ |
| | | $l_6 = 0.152$ | | |
| | $r_{13}+$ 2.448 | | | |
| L$_7$ | $r_{14}-$ 1.115 | $d_7 = 0.276$ | $n_{d_7} = 1.678$ | $v_{d_7} = 55.2$ |
| s' | 0.753 | | | |
| f | 1.000 | | | |

Relative aperture 1:1.6
Useful image angle 28
2y 1.064 where $d_1$ to $d_7$ are the axial thicknesses of said lens elements in the succession from that end of the lens which faces said far conjugate focus to that end of the lens which faces said rear conjugate focus, $r_1$ to $r_{14}$ are the radii of curvature of the surfaces of said lens elements in the succession from that surface which faces said far conjugate focus to that surface which faces said near conjugate focus, $l_1$ to $l_6$ are the lengths of the air gaps between the vertices of lens elements in the succession from that end of the lens which faces said far conjugate focus to that end of the lens which faces said near conjugate focus, $n_{d_1}$ to $n_{d_7}$ are the refractive powers and $v_{d_1}$ to $v_{d_7}$ are the Abbe numbers of said lens elements in the succession from that end of the lens which faces said far conjugate focus to that end of the lens which faces said near conjugate focus.

5. An inverted telephoto-type lens having far and near conjugate foci and comprising a negative forward lens element group disposed at that end of the lens which faces said far conjugate focus, and a positive rear lens element group disposed at that end of the lens which faces said near conjugate focus and separated from said forward lens element group by a substantial air gap, said forward lens element group consisting of a first negative lens component and a biconcave second lens component, said biconcave lens component has a rear surface adjoining said air gap and a forward surface remote from said air gap, said forward and rear surfaaces having radii of curvature $r_3$ and $r_4$, respectively, which meet the condition:

$$|2r_4| < |r_3| < |4 r_4|,$$

said forward lens element groups consists of two lens elements and said rear lens element group consists of five lens element, and which has the following data

| | | | | |
|---|---|---|---|---|
| L$_1$ | $r_1 +$ 10.650 | $d_1 = 0.215$ | $n_{d_1} = 1.487$ | $v_{d_1} = 70.4$ |
| | $r_2 +$ 1.689 | $l_1 = 0.615$ | | |
| | $r_3 -$ 17.000 | | | |
| L$_2$ | $r_4 +$ 6.958 | $d_2 = 0.169$ | $n_{d_2} = 1.518$ | $v_{d_2} = 65.1$ |
| | | $l_2 = 2.415$ | | |
| | $r_5 +$ 4.541 | | | |
| L$_3$ | $r_6 -$ 4.541 | $d_3 = 0.323$ | $n_{d_3} = 1.518$ | $v_{d_3} = 65.1$ |
| | $r_7 +$ 2.548 | $l_3 = 0.015$ | | |

—Continued

| | | $d_4 = 0.262$ | $n_{d_4} = 1.620$ | $v_{d_4} = 60.3$ |
|---|---|---|---|---|
| $L_4$ | $r_8 - 24.784$ | | | |
| | | $l_4 = 0.015$ | | |
| | $r_9 + 0.988$ | | | |
| $L_5$ | | $d_5 = 0.446$ | $n_{d_5} = 1.504$ | $v_{d_5} = 66.9$ |
| | $r_{10} + 13.517$ | | | |
| | | $l_5 = 0.108$ | | |
| | $r_{11} - 4.626$ | | | |
| $L_6$ | | $d_6 = 0.431$ | $n_{d_6} = 1.785$ | $v_{d_6} = 26.1$ |
| | $r_{12} + 0.668$ | | | |
| | | $l_6 = 0.154$ | | |
| | $r_{13} + 2.587$ | | | |
| $L_7$ | | $d_7 = 0.277$ | $n_{d_7} = 1.658$ | $v_{d_7} = 57.3$ |
| | $r_{14} - 1.093$ | | | |

$s' \quad 0.840$
$f \quad 1.000$
Relative aperture 1:1.6
Useful image angle ±28°
$2y = 1.064$ where $d_1$ to $d_7$ are the axial thicknesses of said lens elements in the succession from that end of the lens which faces said far conjugate focus to that end of the lens which faces said near conjugate focus, $r_1$ to $r_{14}$ are the radii of curvature of the surfaces of said lens elements in the succession from that surface which faces said far conjugate focus to that surface which faces said near conjugate focus, $l_1$ to $l_6$ are the lengths of the air gaps between the vertices of lens elements in the succession from that end of the lens which faces said far conjugate focus to that end of the lens which faces said near conjugate focus, $n_{d_1}$ to $n_{d_7}$ are the refractive powers and $v_{d_1}$ to $v_{d_7}$ are the Abbe numbers of said lens elements in the succession from that end of the lens which faces said far conjugate focus to that end of the lens which faces said near conjugate focus.

6. An inverted telephoto-type lens having far and near conjugate foci and comprising
a negative forward lens element group disposed at that end of the lens which faces said far conjugate focus, and
a positive rear lens element group disposed at that end of the lens which faces said near conjugate focus and separated from said forward lens element group by a substantial air gap,
said forward lens element group consisting of a first negative lens component and a biconcave second lens component, said biconcave lens component has a rear surface adjoining said air gap and a forward surface remote from said air gap,
said forward and rear surfaces having radii of curvature $r_3$ and $r_4$, respectively, which meet the condition:

$$|2 r_4| < |r_3| < |4 r_4|,$$

said forward lens element group consists of two lens elements and
said rear lens elements group consists of five lens elements,
and which has the following data

| | | $d_1 = 0.215$ | $n_{d_1} = 1.487$ | $v_{d_1} = 70.4$ |
|---|---|---|---|---|
| $L_1$ | $r_1 + 10.650$ | | | |
| | $r_2 + 1.689$ | | | |
| | | $l_1 = 0.615$ | | |
| | $r_3 - 24.000$ | | | |
| $L_2$ | | $d_2 = 0.169$ | $n_{d_2} = 1.518$ | $v_{d_2} = 65.1$ |
| | $r_4 + 6.215$ | | | |
| | | $l_2 = 2.415$ | | |
| | $r_5 + 4.541$ | | | |
| $L_3$ | | $d_3 = 0.323$ | $n_{d_3} = 1.518$ | $v_{d_3} = 65.1$ |
| | $r_6 - 4.541$ | | | |
| | | $l_3 = 0.015$ | | |
| | $r_7 + 2.548$ | | | |
| $L_4$ | | $d_4 = 0.262$ | $n_{d_4} = 1.620$ | $v_{d_4} = 60.3$ |
| | $r_8 - 24.784$ | | | |
| | | $l_4 = 0.015$ | | |
| | $r_9 + 0.988$ | | | |
| $L_5$ | | $d_5 = 0.446$ | $n_{d_5} = 1.504$ | $v_{d_5} = 66.9$ |
| | $r_{10} + 13.517$ | | | |
| | | $l_5 = 0.108$ | | |
| | $r_{11} - 4.626$ | | | |
| $L_6$ | | $d_6 = 0.431$ | $n_{d_6} = 1.785$ | $v_{d_6} = 26.1$ |
| | $r_{12} + 0.668$ | | | |
| | | $l_6 = 0.154$ | | |
| | $r_{13} + 2.587$ | | | |
| $L_7$ | | $d_7 = 0.277$ | $n_{d_7} = 1.658$ | $v_{d_7} = 57.3$ |
| | $r_{14} - 1.093$ | | | |

$s' \quad 0.840$
$f \quad 1.000$
Relative aperture 1:1.6
Useful image angle 28
$2y \ 1.064$ where $d_1$ to $d_7$ are the axial thicknesses of said lens elements in the succession from that end of the lens which faces said far conjugate focus to that end of the lens which faces said near conjugate focus, $r_1$ to $r_{14}$ are the radii of curvature of the surfaces of said lens elements in the succession from that surface which faces said far conjugate focus to that surface which faces said near conjugate focus, $l_1$ to $l_6$ are the lengths of the air gaps between the vertices of lens elements in the succession from that end of the lens which faces said far conjugate focus to that end of the lens which faces said near conjugate focus, $n_{d_1}$ to $n_{d_7}$ are the refractive powers and $v_{d_1}$ to $v_{d_7}$ are the Abbe numbers of said lens elements in the succession from that end of the lens which faces said far conjugate focus to that end of the lens which faces said near conjugate focus.

7. An inverted telephoto-type lens having far and near conjugate foci and comprising a negative forward lens element group disposed at that end of the lens which faces said far conjugate focus, and a positive rear lens element group disposed at that end of the lens which faces said near conjugate focus and separated from said forward lens element group by a substantial air gap, said forward lens element group consisting of a first negative lens component and a biconcave second lens component, said biconcave lens component has a rear surface adjoining said air gap and a forward surface remote from said air gap, said forward and rear surfaces having radii of curvature $r_3$ and $r_4$, respectively, which meet the condition:

$|2 r_4| < |r_3| < |4 r_4|$, and having the following data:

| | | | | |
|---|---|---|---|---|
| $L_1$ | $r_1 + 10.560$ | $d_1 = 0.210$ | $n_{d_1} = 1.487$ | $v_{d_1} = 70.4$ |
| | $r_2 + 1.608$ | $l_1 = 0.611$ | | |
| $L_2$ | $r_3 - 21.033$ | $d_2 = 0.171$ | $n_{d_2} = 1.518$ | $v_{d_2} = 65.1$ |
| | $r_4 + 6.439$ | $l_2 = 2.405$ | | |
| $L_3$ | $r_5 + 3.878$ | $d_3 = 0.552$ | $n_{d_3} = 1.518$ | $v_{d_3} = 65.1$ |
| | $r_6 - 5.465$ | $l_3 = 0.013$ | | |
| $L_4$ | $r_7 + 2.536$ | $d_4 = 0.315$ | $n_{d_4} = 1.620$ | $v_{d_4} = 60.3$ |
| | $r_8 - 25.565$ | $l_4 = 0.011$ | | |
| $L_5$ | $r_9 + 1.084$ | $d_5 = 0.512$ | $n_{d_5} = 1.504$ | $v_{d_5} = 66.9$ |
| | $r_{10}$ plan | $l_5 = 0.097$ | | |
| $L_6$ | $r_{11} - 4.616$ | $d_6 = 0.526$ | $n_{d_6} = 1.785$ | $v_{d_6} = 26.1$ |
| | $r_{12} + 0.673$ | $l_6 = 0.155$ | | |
| $L_7$ | $r_{13} + 2.037$ | $d_7 = 0.289$ | $n_{d_7} = 1.691$ | $v_{d_7} = 54.7$ |
| | $r_{14} - 1.345$ | | | |

$s' = 0.731$
$f = 1.000$
relative opening 1:1.3
±25°
$2y = 0.933$

8. An inverted telephoto-type lens having far and near conjugate foci and comprising a negative forward lens element group disposed at that end of the lens which faces said far conjugate focus, and a positive rear lens element group disposed at that end of the lens which faces said near conjugate focus and separated from said forward lens element group by a substantial air gap, said forward lens element group consisting of a first negative lens component and a biconcave second lens component, said biconcave lens component has a rear surface adjoining said air gap and a forward surface remote from said air gap, said forward and rear surfaces having radii of curvature $r_3$ and $r_4$, respectively, which meet the condition:

$|2 r_4| < |r_3| < |4 r_4|$, and having the following data:

| | | | | |
|---|---|---|---|---|
| $L_1$ | $r_1 + 10.654$ | $d_1 = 0.210$ | $n_{d_1} = 1.487$ | $v_{d_1} = 70.4$ |
| | $r_2 + 1.613$ | $l_1 = 0.611$ | | |
| $L_2$ | $r_3 - 20.929$ | $d_2 = 0.170$ | $n_{d_2} = 1.518$ | $v_{d_2} = 65.1$ |
| | $r_4 + 6.473$ | $l_2 = 2.403$ | | |
| $L_3$ | $r_5 + 3.881$ | $d_3 = 0.551$ | $n_{d_3} = 1.518$ | $v_{d_3} = 65.1$ |
| | $r_6 - 5.498$ | $l_3 = 0.010$ | | |
| $L_4$ | $r_7 + 2.534$ | $d_4 = 0.300$ | $n_{d_4} = 1.620$ | $v_{d_4} = 60.3$ |
| | $r_8 - 26.385$ | $l_4 = 0.010$ | | |
| $L_5$ | $r_9 + 1.087$ | $d_5 = 0.601$ | $n_{d_5} = 1.500$ | $v_{d_5} = 61.4$ |
| | $r_{10}$ plan | $l_5 = 0.082$ | | |
| $L_6$ | $r_{11} - 1.980$ | $d_6 = 0.526$ | $n_{d_6} = 1.847$ | $v_{d_6} = 23.8$ |
| | $r_{12} + 0.638$ | $l_6 = 0.155$ | | |
| $L_7$ | $r_{13} + 1.358$ | $d_7 = 0.290$ | $n_{d_7} = 1.643$ | $v_{d_7} = 48.0$ |
| | $r_{14} - 1.258$ | | | |

$s' = 0.692$
$f = 1.000$
relative opening 1:1.3
± 20°
$2y = 0.728$

* * * * *